United States Patent
Kuhn et al.

(10) Patent No.: US 10,071,626 B2
(45) Date of Patent: Sep. 11, 2018

(54) EXHAUST AFTER-TREATMENT MOUNTING ARRANGEMENT

(71) Applicant: CNH Industrial America LLC, New Holland, PA (US)

(72) Inventors: Frederic George Kuhn, Kiel, WI (US); Karl M. Luebke, New Holstein, WI (US)

(73) Assignee: CNH Industrial America LLC, New Holland, PA (US)

( * ) Notice: Subject to any disclaimer, the term of this patent is extended or adjusted under 35 U.S.C. 154(b) by 99 days.

(21) Appl. No.: 15/137,694

(22) Filed: Apr. 25, 2016

(65) Prior Publication Data

US 2016/0318388 A1 Nov. 3, 2016

Related U.S. Application Data

(60) Provisional application No. 62/153,807, filed on Apr. 28, 2015.

(51) Int. Cl.
*B60K 13/04* (2006.01)
*F01N 3/20* (2006.01)
(Continued)

(52) U.S. Cl.
CPC .............. *B60K 13/04* (2013.01); *F01N 3/055* (2013.01); *F01N 3/103* (2013.01); *F01N 3/2066* (2013.01);
(Continued)

(58) Field of Classification Search
CPC . B60K 13/04; F01N 13/1816; F01N 13/1822; F01N 13/009; F01N 13/1805;
(Continued)

(56) References Cited

U.S. PATENT DOCUMENTS 3,358,787 A * 12/1967 Bangasser .............. B60K 11/08
180/69.2
3,976,087 A  8/1976 Bolton et al.
(Continued)

FOREIGN PATENT DOCUMENTS

JP  2014177914 A * 9/2014 ............. A01D 41/12
WO 2014030968 A1  2/2014

OTHER PUBLICATIONS

Cummins: "Meeting Emissions—The Cummins Solution": Web-Site—http://cumminsengines.com/cummins-aftertreatment-system; 2014; pp. 1-2; Columbus IN, US.
(Continued)

*Primary Examiner* — James A Shriver, II
*Assistant Examiner* — Steven M Clemmons
(74) *Attorney, Agent, or Firm* — Rebecca L. Henkel; Rickard K. DeMille

(57) ABSTRACT

An exhaust after-treatment mounting arrangement is provided that is mounted outside of an engine compartment and has a perforated enclosure allowing air to permeate the enclosure and establish an airflow through the enclosure to maintain part integrity of components of an exhaust after-treatment system with maximum temperature thresholds. Components of the exhaust after-treatment system may be mounted to permit movement of such components relative to upstream and downstream components in the exhaust system. The enclosure is configured to prevent contact of the hot components by operators and/or flammable materials with small venting holes through top surfaces of the enclosure and large vent holes in bottom areas of the box that allow large volumes of air to easily flow into the enclosure.

1 Claim, 3 Drawing Sheets

(51) Int. Cl.
*F01N 3/05* (2006.01)
*F01N 3/10* (2006.01)
*F01N 13/18* (2010.01)
*F01N 13/00* (2010.01)

(52) U.S. Cl.
CPC ....... *F01N 13/009* (2014.06); *F01N 13/1816* (2013.01); *F01N 13/1822* (2013.01); *F01N 13/1844* (2013.01); *B60Y 2200/22* (2013.01); *F01N 2340/04* (2013.01); *F01N 2590/08* (2013.01); *Y02T 10/24* (2013.01)

(58) Field of Classification Search
CPC ............. F01N 13/1811; F01N 2590/08; B60Y 2200/22
See application file for complete search history.

(56) References Cited

U.S. PATENT DOCUMENTS

| | | | | |
|---|---|---|---|---|
| 4,020,915 | A | * | 5/1977 | Darnell .................. B60K 13/04 180/296 |
| 4,265,332 | A | | 5/1981 | Presnall et al. |
| 4,351,535 | A | | 9/1982 | Mead |
| 5,636,799 | A | | 6/1997 | Trusty et al. |
| 5,660,334 | A | | 8/1997 | Trusty et al. |
| 6,358,109 | B1 | | 3/2002 | Neisen |
| 6,729,127 | B2 | * | 5/2004 | Woerner ................. F01N 3/023 60/297 |
| 6,863,154 | B2 | | 3/2005 | Uegane et al. |
| 7,066,495 | B2 | * | 6/2006 | Thomas .............. F01N 13/1816 285/226 |
| 7,506,667 | B1 | * | 3/2009 | Johnson ............. F01N 13/1816 138/114 |
| 7,717,205 | B2 | * | 5/2010 | Kertz .................... B60K 13/04 180/68.1 |
| 7,775,561 | B2 | * | 8/2010 | Swank ............... F01N 13/1816 285/236 |
| 7,941,995 | B2 | | 5/2011 | Goss et al. |
| 8,141,535 | B2 | * | 3/2012 | Olsen ................. F01N 13/1805 123/195 A |
| 8,167,067 | B2 | | 5/2012 | Peterson et al. |
| 8,230,678 | B2 | * | 7/2012 | Aneja .................... F01N 3/033 60/295 |
| 8,281,575 | B2 | | 10/2012 | Merchant et al. |
| 8,444,213 | B2 | * | 5/2013 | Ringer .................... F16J 12/00 296/190.01 |
| 8,491,845 | B2 | | 7/2013 | Ettireddy et al. |
| 8,505,661 | B2 | * | 8/2013 | Tsuji ..................... E02F 3/7609 180/68.4 |
| 8,596,049 | B2 | | 12/2013 | Isada et al. |
| D700,631 | S | * | 3/2014 | Novacek .................... D15/17 |
| 8,746,387 | B2 | | 6/2014 | Ringer et al. |
| 8,857,384 | B2 | | 10/2014 | Yotsuzuka |
| 8,936,128 | B2 | * | 1/2015 | Numa ................... F01N 3/2066 180/309 |
| 8,938,954 | B2 | | 1/2015 | De Rudder et al. |
| 8,967,319 | B2 | * | 3/2015 | Novacek ............... B60K 13/04 180/309 |
| 9,103,254 | B2 | * | 8/2015 | Merchant ............... F01N 3/025 |
| 9,200,550 | B2 | * | 12/2015 | Mori ................... E02F 9/0866 |
| 9,222,383 | B2 | * | 12/2015 | Togo ................... F01N 13/1811 |
| 9,562,344 | B2 | * | 2/2017 | Kumagai ............... B60K 13/04 |
| 9,670,646 | B2 | * | 6/2017 | Ohmura ............... E02F 9/0866 |
| 9,732,647 | B2 | * | 8/2017 | Daborn .................... F01N 3/035 |
| 2008/0302089 | A1 | | 12/2008 | Way et al. |
| 2011/0023452 | A1 | * | 2/2011 | Gisslen ............... F01N 13/1827 60/272 |
| 2011/0192153 | A1 | | 8/2011 | Schmidt |
| 2011/0283687 | A1 | * | 11/2011 | Dobler ................. F01N 13/1805 60/299 |
| 2012/0273648 | A1 | * | 11/2012 | Maske .................. B60K 13/04 248/636 |
| 2014/0154139 | A1 | | 6/2014 | Van Niekerk et al. |
| 2014/0174057 | A1 | | 6/2014 | Ludeman et al. |
| 2014/0290781 | A1 | * | 10/2014 | Ozaki ....................... F16L 3/08 138/106 |
| 2014/0331658 | A1 | | 11/2014 | Adupala et al. |
| 2015/0001170 | A1 | * | 1/2015 | Terata ..................... B01D 53/94 212/302 |
| 2016/0303511 | A1 | * | 10/2016 | Nagano ............. B01D 53/9431 |

OTHER PUBLICATIONS

Springer; "Chapter 2: SCR Technology for Off-Highway (Large Diesel Engine) Application" Web-Site—www.springer.com/.../ 9781489980700 . . . ; Dec. 2014; pp. 33-61; New York, NY, US.
Mats Laurell et al.; 22nd AACHEN COLLOQUIUM; "The innovative exhaust gas aftertreatment system for the Volvo 4 Cylinder Engines"; Web-Site—http://www.emitec.com/fileadmin/user_upload/Bibliothek/Vortraege/2013/131010_Compact_cat_Aachen.pdf; 2013; pp. 1-20; DE.

\* cited by examiner

EXHAUST AFTER-TREATMENT MOUNTING ARRANGEMENT

CROSS REFERENCE TO RELATED APPLICATIONS

This is a non-provisional application based upon U.S. provisional patent application Ser. No. 62/153,807, entitled "Exhaust After-treatment Mounting Arrangement," filed Apr. 28, 2015, which is incorporated herein by reference.

FIELD OF THE INVENTION

The invention relates generally to off-road agricultural vehicles with exhaust after-treatment systems and in particular, to an exhaust after-treatment mounting arrangement.

BACKGROUND OF THE INVENTION

Exhaust after-treatment components are needed for many diesel engines to comply with emissions requirements. These after-treatment components can be huge, making them difficult to incorporate into an engine compartment. Some after-treatment components produce a great amount of heat at times during operation, such as during regeneration cycles.

SUMMARY OF THE INVENTION

An exhaust after-treatment mounting arrangement is provided that mounts all of the exhaust after-treatment components in a single box that prevents contact of the hot components by operators and/or flammable materials. This may be done with small venting holes through top surfaces of the box making these surfaces access restricting shielding surfaces and large vent holes in bottom areas of the box that facilitates drawing air into the box so that the box does not require forced air for cooling. The box is arranged outside of the engine compartment with the exhaust after-treatment components flexibly mounted to upstream and downstream exhaust tubing.

According to one aspect of invention, the exhaust after-treatment components are mounted in an enclosure that has different surfaces with different sized openings to restrict penetrability by operators and/or flammable materials through relatively exposed surfaces. This may be done by configuring the enclosure with relatively small venting holes at easily accessible exposed surfaces. The relatively small venting holes allow sufficient air permeability to maintain acceptable temperatures in an interior of the enclosure while blocking inadvertent operator contact of the hot exhaust after-treatment components. The relatively small venting holes are small enough to be substantially impenetrable by flammable materials that are encountered during use such as field debris and/or other flammable airborne particulates and materials. Large openings at less accessible surfaces of the enclosure allow for high flow rates of air through the enclosure and provide debris releasing openings at the bottom as a substantially open bottom that minimizes accumulation of dust or other material that may enter the enclosure during use.

According to another aspect of intervention, an after-treatment system is entirely housed in an externally mounted and vented after-treatment housing box next to the cab of a self-propelled sprayer and outside of the engine compartment. The after-treatment system has a diesel oxidation catalyst (DOC) unit, decomposition reactor (DRT) unit, and a selective catalytic reduction (SCR) unit all mounted in the after-treatment housing box. A first flexible bellows connects a pipe from the engine exhaust manifold to a downpipe that feeds the DOC at an inlet portion of the after-treatment system, vibration and movement isolating the after-treatment system from the engine. A second flexible bellows connects an outlet tube of the SCR to an exhaust stack at an outlet portion of the after-treatment system, vibration and movement isolating the after-treatment system from the exhaust stack. The after-treatment housing box has perforated front, back, top, bottom, inner side, and outer side walls. One end of the after-treatment housing box is isolation/rubber mounted to a single mounting point. The opposite end is rigid mounted through a multi-plane mounting arrangement with multiple fasteners.

The externally mounted after-treatment housing box mounts the after-treatment system in a location that allows for easy component inspection, does not occupy space within a crowded engine compartment, and facilitates dissipating system heat while of minimizing heating of other components of the self-propelled sprayer. The DOC, DRT, and SCR are arranged in a stacked configuration with the SCR above the DOC and DRT to define a vertically climbing and longitudinally reversing exhaust flow path through the after-treatment system. This is done by receiving exhaust gases into the DOC at a forward end of the after-treatment housing box, such as through the perforated front wall. The exhaust flow is directed through the DOC and DRT in a first longitudinal direction. Exhaust flow leaves the DRT and is directed vertically up into the SCR at a rearward end of the after-treatment housing box. In the SCR, the exhaust flow changes direction from vertical to a second, opposite, longitudinal direction. The exhaust flow exits the SCR and thus the after-treatment system at the forward end of the after-treatment housing box, such as through the perforated front wall and is directed vertically upward through the exhaust stack. The DOC, DRT, and SCR have electrical, coolant, and DEF fluid connections with respective wire and hose leads to them. These components have defined maximum temperature thresholds to maintain part integrity. The engine exhaust gas and additional heat from regeneration cycles create significant heat radiation. The under/over orientation of the DOC, DRT, and SCR captures some of the electrical and fluid connections in an area where they have heat sources on two sides of them. To protect the electrical and fluid handling components from heat damage, there is a system of slots and holes to allow airflow through the after-treatment housing box. A perforated bottom wall of the after-treatment housing box draws in ambient air from below the after-treatment housing box. This helps establish a chimney effect within the after-treatment housing box through an opportunely directed box airflow path that removes heat from the DOC, DRT, and SCR.

According to another aspect of the invention, an exhaust after-treatment mounting arrangement is provided, which may be used with an off-road agricultural vehicle. The off-road agricultural vehicle has a chassis supporting a cab and an engine compartment that houses an engine with an engine exhaust manifold and an engine exhaust pipe extending from the engine exhaust manifold away from the engine and out of the engine compartment. An exhaust stack at the end of the exhaust system releases exhaust gasses from the engine. The exhaust after-treatment mounting arrangement includes an exhaust after-treatment system for treating the exhaust of the engine as treated exhaust gasses. Treated exhaust gases are directed from the exhaust after-treatment system to the exhaust stack. An after-treatment housing box is arranged outwardly of the cab and the engine compartment and includes interconnected walls enclosing the exhaust after-treatment system. The after-treatment housing box includes a venting system for receiving ambient air into the after-treatment housing box and establishing an airflow through the after treatment housing box for cooling the exhaust after-treatment system. A flexible mounting system with flexible bellows allows relative movement of the exhaust after-treatment system and the after-treatment housing box relative to the cab and the engine compartment. A first flexible bellows is arranged between the engine exhaust pipe and an inlet portion of the exhaust after-treatment system. The first flexible bellows is configured to allow relative movement between the engine exhaust pipe and the exhaust after-treatment system. A second flexible bellows is arranged between the outlet portion of the exhaust after-treatments system and the exhaust stack. The second flexible bellows is configured to allow relative movement between the exhaust after-treatment system and the exhaust stack.

According to another aspect invention, the venting system of the after-treatment housing box includes at least one perforated wall defined by at least one of the interconnected walls of the after-treatment housing box. The venting system may provide an arrangement of slots and holes.

According to another aspect invention, the exhaust after-treatment system comprises a connector system including at least one of an electrical connector, a coolant connector, and a diesel exhaust fluid (DEF) connector arranged inside the after-treatment housing box. The venting system may be configured to direct an airflow through the after-treatment housing box for cooling the connector system. The exhaust after-treatment system may include at least one of a diesel oxidation catalyst (DOC) unit, a decomposition reactor (DRT) unit, and a selective catalytic reduction (SCR) unit. The exhaust after-treatment system may include each of the DOC, the DRT, and the SCR units, with the DOC unit receiving exhaust gasses from the engine, the DRT unit receiving exhaust gasses from the DOC unit, and the SCR unit receiving exhaust gasses from the DRT unit. The DOC, DRT, and SCR units may be arranged in a stacked configuration with the SCR unit arranged above the DOC and DRT units. The after-treatment housing box may include a perforated front wall and the DOC unit may be arranged adjacent to the perforated front wall.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
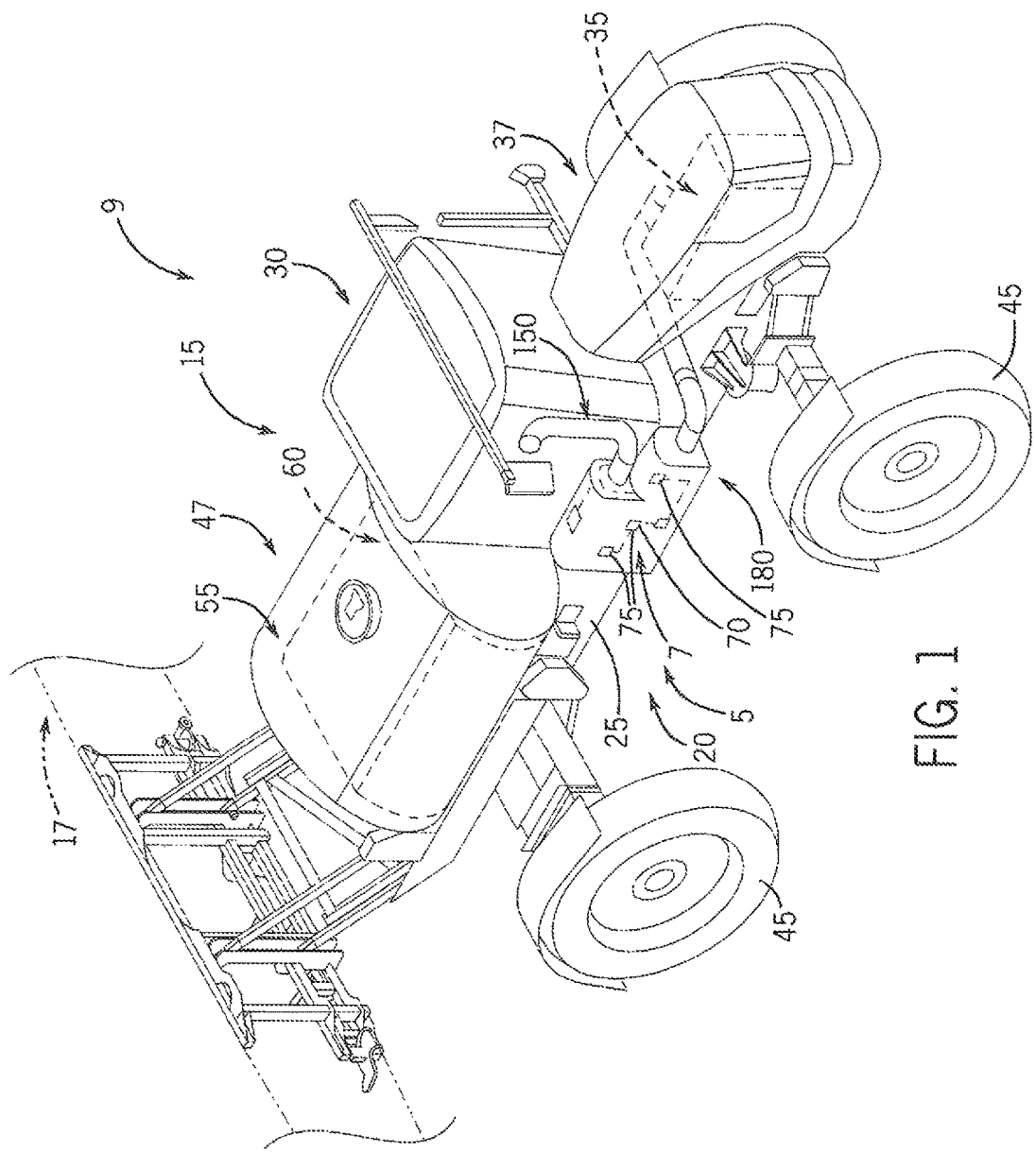
FIG. 1 is a pictorial view of an off-road agricultural vehicle with an exhaust after-treatment mounting arrangement according to the present invention.

Referring now to the drawings and specifically to FIG. 1, an exhaust after-treatment mounting arrangement 5 having exhaust after-treatment system 7, is shown used with off-road agricultural vehicle 9. Off-road agricultural vehicle 9 is represented as an applicator 15, shown here as a rear-boom self-propelled agricultural sprayer vehicle or rear-boom self-propelled sprayer, such as those available from CNH Industrial, such as the Miller Condor Series sprayers and New Holland Guardian Series rear-boom sprayers. Although applicator 15 is shown as a rear-boom self-propelled sprayer, it is understood that applicator 15 can instead be configured as a dry product spreader with a dry box or spinner box for broadcast-type delivery of dry product. Furthermore, applicator 15 can instead be a front-boom sprayer, such as those available from CNH Industrial, including the Miller Nitro and New Holland Guardian Series front-boom sprayers. It is further understood that off-road agricultural vehicle 9 may include other self-propelled implements, tractors, or other off-road agricultural vehicles 9.

Referring again to FIG. 1, applicator 15 includes chassis 20 having chassis frame 25 that supports various assemblies, systems, and components. These various assemblies, systems, and components include boom system 17, cab 30, and engine 35 housed in engine compartment 37. In mechanical drive applications, a mechanical transmission receives power from engine 35 and delivers power for rotating wheels 45 by way of power-transmitting driveline components such as drive shafts, differentials, and other gear sets in portal, drop boxes, or other housings. For hydraulic drive systems, a hydraulic system receives power from engine 35 and includes at least one hydraulic pump which may be in a hydrostat arrangement for providing hydraulic pressure for operating hydraulic components within the hydraulic system, including hydraulic motors that are operably connected to the hydraulic pump(s) for rotating wheels 45. Applicator 15 has a spray system 47 that includes storage containers such as a rinse tank storing water or a rinsing solution and product tank 55 that stores a volume of product 60 for delivery onto an agricultural field with applicator 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height adjustable boom of the boom system 17 for release out of spray nozzles that are spaced from each another along the width of boom during spraying operations of applicator 15.

Figure 2:
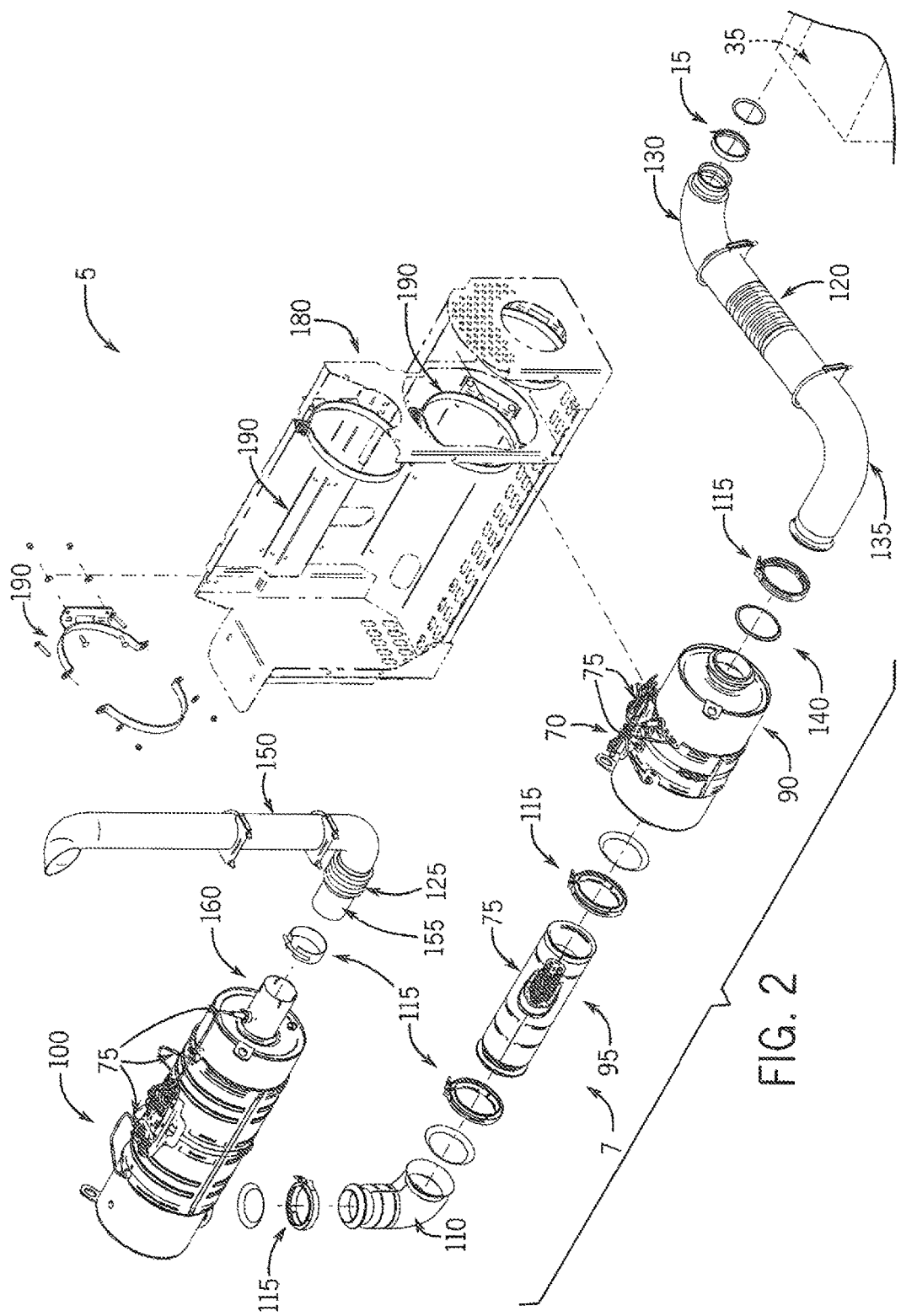
FIG. 2 is an exploded pictorial view of an exhaust after-treatment mounting arrangement.

Still referring to FIG. 1, exhaust after-treatment system 7 includes connector system 70 that has connectors 75 which may include various electrical connectors, coolant connectors, diesel exhaust fluid (DEF) connectors and injectors, probes and other sensors and operably connected to various components of exhaust after-treatment system 7 for their respective monitoring and control. Referring now to FIG. 2, components of exhaust after-treatment system 7 are shown as diesel oxidation catalyst (DOC) unit 90, decomposition reactor (DRT) unit 95, and selective catalytic reduction (SCR) unit 100. When treating the exhaust gases in exhaust after-treatment system 7, DOC unit 90 receives exhaust gasses from engine 35. DRT unit 95 receives exhaust gasses from DOC unit 90 and SCR unit 100 receives exhaust gasses from DRT unit 95. The DOC, DRT, and SCR 90, 95, 100 units are connected to each other with various fittings, pieces of tubing and/or connectors such as elbow 110 and clamp(s) 115. DOC, DRT, and SCR 90, 95, 100 units are arranged in a stacked configuration with the SCR unit 100 arranged above the DOC and DRT units 90, 95.

Still referring to FIG. 2, exhaust after-treatment mounting arrangement 5 is configured to maintain temperatures of connector system 70 to not exceed maximum temperature thresholds to maintain part integrity of the connectors 75 or corresponding components, as explained in greater detail elsewhere herein. Exhaust after-treatment mounting arrangement 5 also flexibly supports the exhaust after-treatment system 7, vibration and movement isolating the exhaust after-treatment system 7 from upstream and downstream components. First and second flexible bellows 120, 125 are respectively arranged upstream and downstream of the exhaust after-treatment system 7, providing flexible connections between the exhaust after-treatment system 7 and corresponding components of the exhaust system.

Still referring to FIG. 2, upstream of the exhaust after-treatment system 7, pipe 130 extends from an exhaust manifold of engine 35. Flexible bellows 120 extends between and interconnects pipe 130 to downpipe 135 connected to an inlet portion 140 of the exhaust after-treatment system 7, shown here as the inlet of DOC unit 90. In this arrangement, flexible bellows 120 allow for relative movement of the exhaust after-treatment system 7 with respect to engine 35, providing vibration and movement isolation of the exhaust after-treatment system 7 relative to upstream components.

Still referring to FIG. 2, downstream of the exhaust after-treatment system 7, exhaust stack 150 extends in a generally vertical direction next to cab 30 (FIG. 1), supported by cab 30 and/or chassis frame 25. Flexible bellows 125 extends between and interconnects exhaust stack 150 to pipe segment 155 that is connected to an outlet portion 160 of the exhaust after-treatment system 7, shown here as the outlet of SCR unit 100. In this arrangement, flexible bellows 125 allow for relative movement of the exhaust after-treatment system 7 with respect to exhaust stack 150, providing vibration and movement isolation of the exhaust after-treatment system 7 relative to downstream components.

Referring again to FIG. 1, exhaust after-treatment mounting arrangement 5 includes after-treatment housing box 180 that is arranged outwardly of the cab 30 and the engine compartment 37 and includes interconnected walls enclosing the exhaust after-treatment system 7. Referring again to FIG. 2, DOC, DRT, and SCR 90, 95, 100 units are secured in an interior space 185 of after-treatment housing box 180 by way of mounts 190, shown here as clamp or strap mounts.

Figure 3:
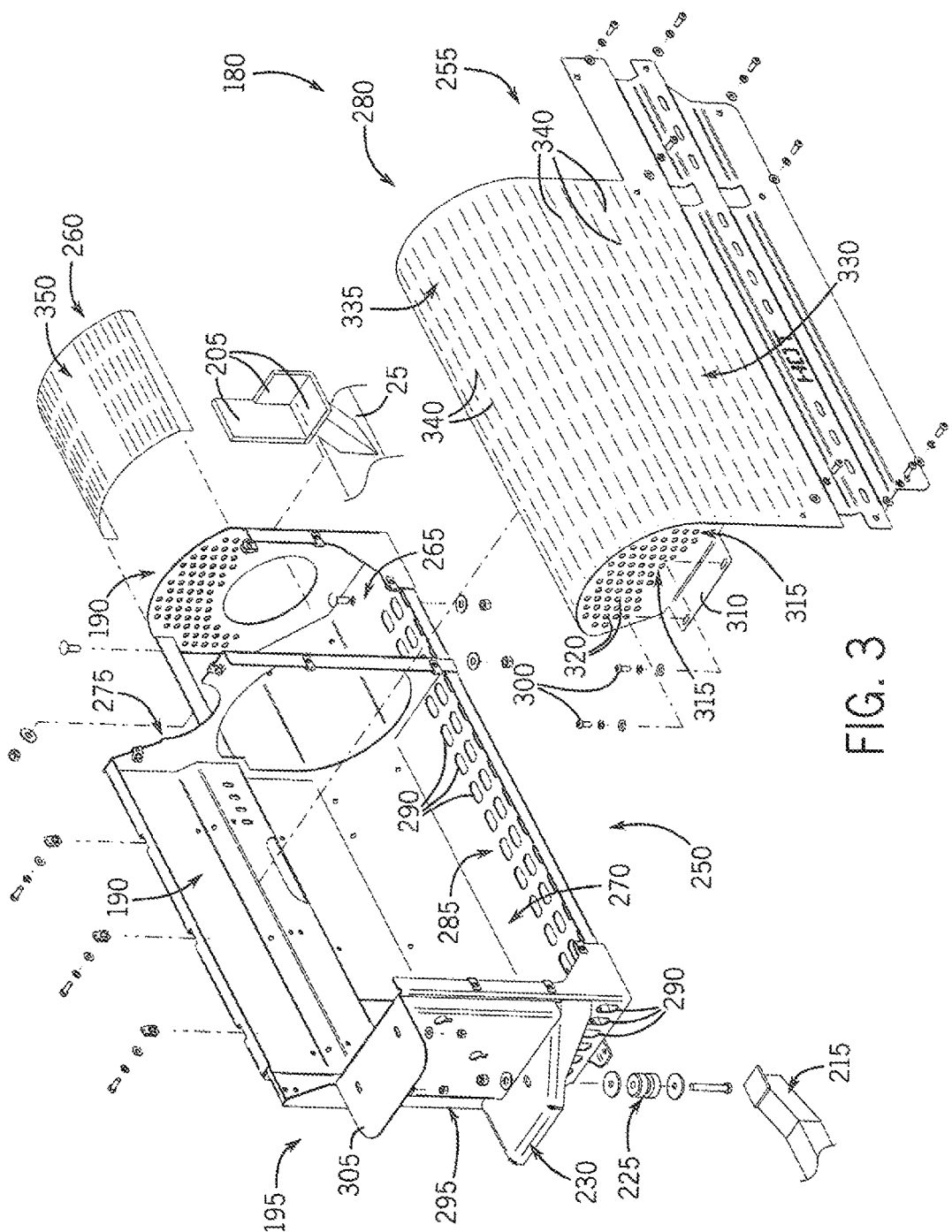
FIG. 3 is an exploded pictorial view of an after-treatment housing box of exhaust after-treatment mounting arrangement according to the present invention.

Referring now to FIG. 3, ends, shown here as front and back ends 190, 195 of the after-treatment housing box 180, are supported by the chassis frame 25. One end, shown here as front end 190, is rigid mounted to bracket 200 connected to chassis frame 25 and having multiple walls 205 into which a corner of the front end 190 nests, providing multi-plane rigid support. The other end, shown here as back end 195, is isolation mounted to a single mounting point supported by bracket 215 that is connected to chassis frame 25. The single mounting point may be defined by an isolation bushing 225 made from rubber or another resilient material arranged between bracket 215 and mounting tab 230 that extend generally horizontally away from back end 195. After-treatment housing box 180 includes a main box 250, shield 255, and cap 260 that together define interconnected walls of an enclosure surrounding the exhaust after-treatment system 7. Main box 250 has first and second compartments 265, 270 that together define the inside space 190 on opposite sides of a divider wall 275.

Still referring to FIG. 3, venting system 280 of the after-treatment housing box includes perforated surfaces of walls of the after-treatment housing box 180 that are configured to protect the electrical and fluid handling components from heat damage, by way of a system of slots and holes to allow airflow to permeate through the after-treatment housing box 180. Bottom wall 285 of main box 250 has a relatively large elongate opening as slots 290 of venting system 280, such that the bottom wall 285 defines a perforated wall with slots 290 as horizontally arranged slots. Slots 290 also extend through a lower portion of a back wall 295 of the main box 250 as vertically arranged slots. Shield 255 connects to the main box 250 by way of fasteners 300 extending through holes of a box rear flange 305 and a shield rear flange 310. When the shield 255 is connected to the main box 250, a rear wall segment 315 of the shield 255 defines an upper portion of the rear wall 295. Rear wall segment 315 includes circular openings as holes 320 of venting system 280, such that the rear wall 295 defines a perforated wall with slots 290 toward the bottom and holes 320 toward the top. Shield 255 includes outer wall 330 and a curved upper wall 335 extending from an upper portion of outer wall 330. Outer and upper walls 330, 335 include circular openings as holes 340 of venting system 280, which are shown as having smaller diameters than those of holes 320. In this way, outer and upper walls 330, 335 define perforated walls with holes 340 covering outer and upper boundaries of the second compartment 270. Cap 260 defines a curved upper wall 350 with circular openings as holes 340 of venting system 280 which, like those of outer and upper walls 330, 335, have smaller diameters than those of holes 320. Upper wall 350 of cap 260 defines a perforated wall covering an upper boundary of the first compartment 265. A front wall 350 of the main box 250 has openings as holes 320 of venting system 280 extending through its upper portion, with holes 320 having larger diameters than those of holes 340. Front wall 350 defines a perforated wall defining a forward boundary of the first compartment 265. In this way, the after-treatment housing box 180 provides a perforated enclosure with openings of different sizes and at different locations as a system of slots and holes that can allow for a substantial amount of airflow upwardly and also longitudinally through the after-treatment housing box 180, while freely allowing ambient air to permeate into and allow release of heated air from the after-treatment housing box 180.

Many changes and modifications could be made to the invention without departing from the spirit thereof. The scope of these changes will become apparent from the appended claims.

We claim:

1. An exhaust after-treatment mounting arrangement for an off-road agricultural vehicle having a chassis supporting a cab and an engine compartment that houses an engine with an engine exhaust manifold and an engine exhaust pipe extending from the engine exhaust manifold away from the engine and out of the engine compartment, an exhaust stack that releases exhaust gasses from the engine, the exhaust after-treatment mounting arrangement comprising:

an exhaust after-treatment system for treating the exhaust of the engine as treated exhaust gasses and directing the treated exhaust gasses to the exhaust stack, wherein the exhaust after-treatment system includes an inlet portion and an outlet portion;

an after-treatment housing box arranged outwardly of the cab and the engine compartment including interconnected walls enclosing the exhaust after-treatment system, the after-treatment housing box including,
  a venting system for receiving ambient air into the after-treatment housing box and establishing an airflow through the after-treatment housing box for cooling the exhaust after-treatment system; and a flexible mounting system for allowing relative movement of the exhaust after-treatment system and the after-treatment housing box relative to the cab and the engine compartment, wherein the flexible mounting system includes:

a first flexible bellows arranged between the engine exhaust pipe and the inlet portion of the exhaust after-treatment system with the first flexible bellows configured to allow relative movement between the engine exhaust pipe and the exhaust after-treatment system; and a second flexible bellows arranged between the outlet portion of the exhaust after-treatments system and the exhaust stack with the second flexible bellows configured to allow relative movement between the exhaust after-treatments system and the exhaust stack;

wherein the after-treatment housing box has a first end and an opposite second end with one of the first and second ends rigidly mounted to the chassis and the other one of the first and second ends of the after-treatment housing box is isolation mounted to a single mounting point.

* * * * *